United States Patent
Connell

(10) Patent No.: US 9,840,130 B2
(45) Date of Patent: Dec. 12, 2017

(54) AIR CONDITIONING SYSTEM UTILIZING THERMAL CAPACITY FROM EXPANSION OF COMPRESSED FLUID

(71) Applicant: Bergstrom, Inc., Rockford, IL (US)

(72) Inventor: Brett Sean Connell, Winnebago, IL (US)

(73) Assignee: Bergstrom Inc., Rockford, IL (US)

( * ) Notice: Subject to any disclaimer, the term of this patent is extended or adjusted under 35 U.S.C. 154(b) by 0 days.

(21) Appl. No.: 14/209,877

(22) Filed: Mar. 13, 2014

(65) Prior Publication Data

US 2014/0260403 A1  Sep. 18, 2014

Related U.S. Application Data

(60) Provisional application No. 61/778,760, filed on Mar. 13, 2013.

(51) Int. Cl.
*B60H 1/32* (2006.01)

(52) U.S. Cl.
CPC .......... *B60H 1/3222* (2013.01); *B60H 1/3202* (2013.01)

(58) Field of Classification Search
CPC .......................... B60H 1/3202; B60H 1/3222
USPC .......................... 62/323.1, 434, 335
See application file for complete search history.

(56) References Cited

U.S. PATENT DOCUMENTS

| | | |
|---|---|---|
| 2,789,234 A | 6/1956 | Lambert et al. |
| 3,590,910 A | 7/1971 | Lorenz |
| 3,627,030 A | 12/1971 | Lorenz |
| 3,807,087 A | 4/1974 | Staats |
| 3,844,130 A | 10/1974 | Wahnish |
| 3,885,398 A | 5/1975 | Dawkins |
| 3,995,443 A | 12/1976 | Iversen |

(Continued)

FOREIGN PATENT DOCUMENTS

| | | |
|---|---|---|
| DE | 4440044 A1 | 5/1996 |
| DE | 100 14 483 A1 | 11/2000 |

(Continued)

OTHER PUBLICATIONS

Bergstrom, Inc., International Preliminary Report on Patentability, PCT/US2014/026687, Sep. 15, 2015, 7 pgs.

(Continued)

*Primary Examiner* — Len Tran
*Assistant Examiner* — Ana Vazquez
(74) *Attorney, Agent, or Firm* — Morgan, Lewis & Bockius LLP

(57) ABSTRACT

A vehicle air conditioning system is provided. The vehicle air conditioning system includes a first vapor compression refrigeration loop. The first vapor compression refrigeration loop includes a first refrigerant compressor and a first evaporator. The vehicle air conditioning system further includes a tank for holding a compressed fluid, an outlet configured to carry expanded fluid from the tank, and a heat exchanger thermally coupled to the first vapor compression refrigeration loop and to the outlet. The heat exchanger is configured to transfer heat from refrigerant carried by the first vapor compression refrigeration loop to fluid carried by the outlet, where the temperature of the fluid carried by the outlet has been reduced as a result of expansion of the fluid upon exiting the tank.

18 Claims, 6 Drawing Sheets

(56) References Cited

U.S. PATENT DOCUMENTS

| | | | |
|---|---|---|---|
| 4,015,182 A | 3/1977 | Erdman |
| 4,217,764 A | 8/1980 | Armbruster |
| 4,271,677 A | 6/1981 | Harr |
| 4,280,330 A | 7/1981 | Harris et al. |
| 4,324,286 A | 4/1982 | Brett |
| 4,359,875 A | 11/1982 | Ohtani |
| 4,412,425 A | 11/1983 | Fukami |
| 4,448,157 A | 5/1984 | Eckstein et al. |
| 4,459,519 A | 7/1984 | Erdman |
| 4,577,679 A | 3/1986 | Hibshman |
| 4,604,036 A | 8/1986 | Sutou et al. |
| 4,617,472 A | 10/1986 | Slavik |
| 4,641,502 A | 2/1987 | Aldrich |
| 4,658,593 A | 4/1987 | Stenvinkel |
| 4,667,480 A | 5/1987 | Bessler |
| 4,694,798 A | 9/1987 | Kato et al. |
| 4,748,825 A | 6/1988 | King |
| 4,825,663 A | 5/1989 | Nijar et al. |
| 4,841,733 A | 6/1989 | Dussault et al. |
| 4,856,078 A | 8/1989 | Konopka |
| 4,893,479 A | 1/1990 | Gillett et al. |
| 4,945,977 A | 8/1990 | D'Agaro |
| 4,947,657 A | 8/1990 | Kalmbach |
| 5,025,634 A | 6/1991 | Dressler |
| 5,046,327 A | 9/1991 | Walker |
| 5,067,652 A | 11/1991 | Enander |
| 5,095,308 A | 3/1992 | Hewitt |
| 5,125,236 A | 6/1992 | Clancey et al. |
| 5,170,639 A | 12/1992 | Datta |
| 5,275,012 A | 1/1994 | Dage et al. |
| 5,307,645 A * | 5/1994 | Pannell ............. B60H 1/00364 454/144 |
| 5,316,074 A | 5/1994 | Isaji et al. |
| 5,333,678 A | 8/1994 | Mellum et al. |
| 5,361,593 A | 11/1994 | Dauvergne |
| 5,376,866 A | 12/1994 | Erdman |
| 5,396,779 A | 3/1995 | Voss |
| 5,402,844 A | 4/1995 | Elluin |
| 5,465,589 A | 11/1995 | Bender et al. |
| 5,497,941 A | 3/1996 | Numazawa et al. |
| 5,501,267 A | 3/1996 | Iritani et al. |
| 5,502,365 A | 3/1996 | Nanbu et al. |
| 5,524,442 A | 6/1996 | Bergmen, Jr. et al. |
| 5,528,901 A | 6/1996 | Willis |
| 5,562,538 A | 10/1996 | Suyama |
| 5,586,613 A | 12/1996 | Ehsani |
| 5,657,638 A | 8/1997 | Erdman et al. |
| 5,682,757 A | 11/1997 | Peterson |
| 5,782,610 A | 7/1998 | Ikeda |
| 5,819,549 A | 10/1998 | Sherwood |
| 5,896,750 A | 4/1999 | Karl |
| 5,898,995 A | 5/1999 | Ghodbane |
| 5,899,081 A | 5/1999 | Evans et al. |
| 5,901,572 A | 5/1999 | Peiffer et al. |
| 5,901,780 A | 5/1999 | Zeigler et al. |
| 5,921,092 A | 7/1999 | Behr et al. |
| 5,934,089 A | 8/1999 | Nakagawa et al. |
| 5,982,643 A | 11/1999 | Phlipot |
| 6,016,662 A | 1/2000 | Tanaka et al. |
| 6,028,406 A | 2/2000 | Birk |
| 6,038,877 A | 3/2000 | Peiffer et al. |
| 6,038,879 A | 3/2000 | Turcotte |
| 6,059,016 A | 5/2000 | Rafalovich et al. |
| 6,073,456 A | 6/2000 | Kawai et al. |
| 6,111,731 A | 8/2000 | Cepynsky |
| 6,112,535 A | 9/2000 | Hollenbeck |
| 6,134,901 A | 10/2000 | Harvest et al. |
| 6,152,217 A | 11/2000 | Ito et al. |
| 6,205,795 B1 | 3/2001 | Backman et al. |
| 6,205,802 B1 | 3/2001 | Drucker et al. |
| 6,209,333 B1 * | 4/2001 | Bascobert ............. B60H 1/3205 62/217 |
| 6,213,867 B1 | 4/2001 | Yazici |
| 6,230,507 B1 | 5/2001 | Ban et al. |
| 6,253,563 B1 | 7/2001 | Ewert et al. |
| 6,276,161 B1 | 8/2001 | Peiffer et al. |
| 6,282,919 B1 | 9/2001 | Rockenfeller |
| 6,351,957 B2 | 3/2002 | Hara |
| 6,405,793 B1 | 6/2002 | Ghodbane et al. |
| 6,411,059 B2 | 6/2002 | Frugier et al. |
| 6,453,678 B1 | 9/2002 | Sundhar |
| 6,457,324 B2 | 10/2002 | Zeigler et al. |
| 6,467,279 B1 | 10/2002 | Backman et al. |
| 6,474,081 B1 | 11/2002 | Feuerecker |
| 6,530,426 B1 | 3/2003 | Kishita et al. |
| 6,626,003 B1 | 9/2003 | Kortüm |
| 6,684,863 B2 | 2/2004 | Dixon et al. |
| 6,725,134 B2 | 4/2004 | Dillen et al. |
| 6,745,585 B2 | 6/2004 | Kelm et al. |
| 6,748,750 B2 | 6/2004 | Choi |
| 6,758,049 B2 | 7/2004 | Adachi et al. |
| 6,889,762 B2 | 5/2005 | Zeigler et al. |
| 6,939,114 B2 | 9/2005 | Iwanami et al. |
| 6,965,818 B2 | 11/2005 | Koenig et al. |
| 6,981,544 B2 | 1/2006 | Iwanami et al. |
| 7,150,159 B1 | 12/2006 | Brummett et al. |
| 7,316,119 B2 | 1/2008 | Allen |
| 7,350,368 B2 | 4/2008 | Heberle et al. |
| 7,591,143 B2 | 9/2009 | Zeigler et al. |
| 7,591,303 B2 | 9/2009 | Zeigler et al. |
| 8,156,754 B2 * | 4/2012 | Hong ................ B60H 1/00885 62/323.1 |
| 8,517,087 B2 * | 8/2013 | Zeigler ............. B60H 1/00907 165/202 |
| 8,919,140 B2 | 12/2014 | Johnson |
| 8,947,531 B2 | 2/2015 | Fischer et al. |
| 9,216,628 B2 | 12/2015 | Self et al. |
| 2001/0010261 A1 | 8/2001 | Oomura et al. |
| 2002/0026801 A1 | 3/2002 | Yamashita |
| 2002/0078700 A1 | 6/2002 | Kelm et al. |
| 2002/0084769 A1 | 7/2002 | Iritani et al. |
| 2002/0108384 A1 | 8/2002 | Higashiyama |
| 2002/0112489 A1 | 8/2002 | Egawa et al. |
| 2002/0157412 A1 | 10/2002 | Iwanami et al. |
| 2002/0157413 A1 | 10/2002 | Iwanami et al. |
| 2003/0041603 A1 | 3/2003 | Tada et al. |
| 2003/0105567 A1 | 6/2003 | Koenig et al. |
| 2003/0106332 A1 | 6/2003 | Okamoto |
| 2004/0168449 A1 | 9/2004 | Homan et al. |
| 2005/0109499 A1 | 5/2005 | Iwanami et al. |
| 2005/0161211 A1 | 7/2005 | Zeigler et al. |
| 2005/0230096 A1 | 10/2005 | Yamaoka |
| 2005/0257545 A1 | 11/2005 | Ziehr et al. |
| 2006/0102333 A1 | 5/2006 | Zeigler et al. |
| 2006/0151163 A1 | 7/2006 | Zeigler et al. |
| 2006/0151164 A1 | 7/2006 | Zeigler et al. |
| 2007/0131408 A1 | 6/2007 | Zeigler et al. |
| 2008/0110185 A1 | 5/2008 | Veettil et al. |
| 2008/0156887 A1 | 7/2008 | Stanimirovic |
| 2008/0196436 A1 | 8/2008 | Connell |
| 2008/0196877 A1 | 8/2008 | Zeigler et al. |
| 2009/0229288 A1 | 9/2009 | Alston et al. |
| 2009/0301702 A1 | 12/2009 | Zeigler et al. |
| 2010/0218530 A1 | 9/2010 | Melbostad |
| 2011/0308265 A1 | 12/2011 | Phannavong |
| 2012/0247135 A1 | 10/2012 | Fakieh |
| 2013/0167577 A1 | 7/2013 | Street |
| 2013/0319630 A1 | 12/2013 | Yamamoto |
| 2014/0066572 A1 * | 3/2014 | Corveleyn ........... C08G 65/007 525/50 |
| 2014/0075973 A1 | 3/2014 | Graaf |
| 2014/0290299 A1 | 10/2014 | Nakaya |
| 2015/0158368 A1 | 6/2015 | Herr-Rathke et al. |
| 2015/0210287 A1 | 7/2015 | Penilla et al. |
| 2015/0239365 A1 | 8/2015 | Hyde et al. |
| 2015/0306937 A1 | 10/2015 | Kitamura et al. |

FOREIGN PATENT DOCUMENTS

| | | |
|---|---|---|
| DE | 10 2005 004 950 A1 | 8/2006 |
| DE | 10 2010 054965 | 6/2012 |
| EP | 0963895 A2 | 12/1999 |
| EP | 1 024 038 A2 | 8/2000 |
| EP | 2048011 A1 | 4/2009 |

(56) References Cited

FOREIGN PATENT DOCUMENTS

| | | |
|---|---|---|
| FR | 2966391 A1 | 4/2012 |
| JP | 5032121 | 2/1993 |
| JP | H07186711 A | 7/1995 |
| JP | H97-76740 A | 3/1997 |
| JP | 2000-108651 | 4/2000 |
| JP | 2002-081823 | 3/2002 |
| JP | 2005044551 A | 2/2005 |
| JP | 2006-264568 A | 10/2006 |
| JP | 2012017029 A | 1/2012 |
| JP | 2012017029 A * | 1/2012 |
| WO | WO 89/09143 A1 | 10/1989 |
| WO | WO 99/61269 | 12/1999 |
| WO | WO 00/00361 | 1/2000 |
| WO | WO 2006/082082 | 8/2006 |
| WO | WO 2014/112320 A1 | 7/2014 |

OTHER PUBLICATIONS

Bergstrom, Inc., International Preliminary Report on Patentability, PCT/US2014/026683, Sep. 15, 2015, 6 pgs.

Alfa Laval Website, 115 Years in the USA, http://www.alfalaval.com/ecore-Java/WebObjects/ecoreJava.woa/wa/shoNode?siteNodelID-1668&cont . . . ; date last visited May 18, 2007; 1 page.

GEA, FlatPlate Heat Exchangers; GEA FlatPiate Inc.; website—http://www.flatplate.com/profile.html; date last visited Aug. 9, 2007; 3 pages.

Glacier Bay Inc., Glacier Bay's Home Page, page printed from a website, htt(?:i/web.archive.org/web/19990417062255/htt[2://www.glacierbay.com/, apparent archive date: Apr. 17, 1999, 1 page.

Glacier Bay Inc., Darpa/Glacier Bay ECS, pages printed from a website, httir//web.archive.org/web/19991104132941/wvvw.glacierbay.com/darQatxt. htm, apparent archive date: Nov. 4, 1999, 2 pages.

Glacier Bay Inc., Glacier Bay ECS DARPA Project—Final Report, pages printed from a website, httn://web.archive.or_gjweb/19991103001512/v•vww ,_g.Jacierbay.com/Darnhtm.htm, apparent archive date: Nov. 3, 1999, 9 pages.

Glacier Bay Inc., Glacier Bay ECS DARPA Project—Project Photos, pages printed from a website, httg://web.archive.org/web/1999"1103012854/www .glacierbay.com/Dargghotos.htm, apparent archive date: Nov. 3, 1999, 2 pages.

Glacier Bay Inc., Glacier Bay ECS DARPA Project—Operational Video, page printed from a website, httQ://web.archive.orq/web/19991022221040/wvvw .qlacierbay.com/DarQvid.htm, apparent archive date Oct. 22, 1999; 1 page.

Glacier Bay Inc., R & D, pages printed from a website, htt://web.archive.org/web/20000121130306/www.glacierbay.com/R&D.htm, apparent archive date: Jan. 21, 2000, 2 pages.

Glacier Bay Inc., Company History, pages printed from a website, httg://web.archive.org/web/20000301153828/www .g!acierbay.corn/History:.htrn, apparent archive date: Mar. 1, 2000; 2 pages.

Glacier Bay Inc., Contact, page printed from a website, httQ://web.archive.orq/web/19990508104511/W\"'I!V .qlacierba:t.com/Contact.htm, apparent archive date: May 8, 1999; 1 page.

Michael Löhle, Günther Feuerecker and Ulrich Salzer; Non-Idling HVAC-module for Long Distance Trucks; SAE Technical Paper Series 1999-01-1193; International Congress and Exposition, Detroit, Michigan; Mar. 1-4, 1999; 8 pages.

Mahmoud Ghodbane; On Vehicle Performance of a Secondary Loop A/C System; SAE Technical Paper Series 2000-01-1270; SAE 2000 World Congress, Detroit, Michigan; Mar. Jun. 9, 2000; 6 pages.

Masami Konaka and Hiroki Matsuo; SAE Technical Paper Series 2000-01-1271; SAE 2000 World Congress, Detroit, Michigan; Mar. 6-9, 2000; 6 pages.

Frank Stodolsky, Linda Gaines, and Anant Vyas; Analysis of Technology Options to Reduce the Fuel Consumption of Idling Trucks; Paper-Center for Transportation Research, Energy Systems Division, Argonne National Laboratory,9700 South Cass Avenue, Argonne, Illinois 60439;Jun. 2000; 30 pages.

Paper No. 26 in IPR2012-00027, Jun. 11, 2013, 12 pgs. (U.S. Pat. No. 7,591,303).

Patricia Gardie and Vincent Goetz; Thermal Energy Storage System by Solid Absorption for Electric Automobile Heating and Air-Conditioning; Paper; 5 pages.

TropiCool No-idle Heating & Cooling, 110V/12V High-efficiency, Self-contained, Electrified Heating/AC System; ACC Climate Control Brochure, Elkhart, Indiana; 2005, 1 page.

TropiCool Power Plus, More comfort. More efficiency. More options; ACC Climate Control Brochure, Elkhart, Indiana; 2006, 3 pages.

Packless Industries, the leader in refrigerant to water coaxial hear exchangers, flexible hoses and sucti . . . ; website—http://www.packless.com/profile.htmle: date last visited Aug. 9, 2007; 1 page.

Bergstrom Inc., International Search Report and Written Opinion, PCT/US2014/026683, Jul. 3, 2014, 9 pgs.

Bergstrom, Inc., International Search Report and Written Opinion, PCT/US2014/026687, 12 pgs.

Bergstrom, Inc., Communication Pursuant to Rules 161(2) and 162 EPC, EP14717604.4, Oct. 23, 2015, 2 pgs.

Bergstrom, Inc., Communication Pursuant to Rules 161(2) and 162 EPC, EP14722438.0, Nov. 2, 2015. 2 pgs.

Connell, Office Action U.S. Appl. No. 14/209,961, filed Dec. 2, 2015, 14 pgs.

Zeigler, Office Action, U.S. Appl. No. 13/661,519, filed Oct. 28, 2015, 20 pgs.

Anonymous: "NITE Connected Climate Controlled Transport Monitoring/Mobile Internet of Things UI Design/Mobil UI: Progress/Printers/Internet of Things, User Inter . . . ," Oct. 19, 2016 retrieved from: URL:htps://za.pinterest.com/pin/192810427773981541/, 1 pgs.

Bergstrom. Inc., International Search Report and Written Opinion, PCT/US2016/021602, Nov. 3, 2016, 17 pgs.

Bergstrom, Inc., Communication Pursuant to Rules 161(2) and 162 EPC, EP13795064.8, Jun. 22, 2016, 2 pgs.

Connell, Final Office Action, U.S. Appl. No. 14/209,961, filed Jul. 25, 2016, 15 pgs.

Zeigler, Notice of Allowance, U.S. Appl. No. 13/661,519, filed Jun. 17, 2016, 8 pgs.

Bergstrom, Inc., Office Action, CN201480027137.4, dated Mar. 3, 2017, 15 pgs.

Bergstrom, Inc., Office Action, CN201480027117.7, dated Mar. 9, 2017, 8 pgs.

Bergstrom, Inc., International Preliminary Report on Patentability, PCT/US2013/068331, dated May 10, 2016, 6 pgs.

Bergstrom, Inc., Communication Pursuant to Article 94(3), EP14717604.4, Jun. 2, 2017, 12 pgs.

Connell, Notice of Allowance, U.S. Appl. No. 14/209,961, dated Jun. 15, 2017, 10 pgs.

Connell, Notice of Allowance, U.S. Appl. No. 15/064,552, dated Jun. 1, 2017, 9 pgs.

\* cited by examiner

AIR CONDITIONING SYSTEM UTILIZING THERMAL CAPACITY FROM EXPANSION OF COMPRESSED FLUID

CROSS-REFERENCE

This application claims priority to U.S. Provisional Application No. 61/778,760, filed Mar. 13, 2013, the contents of which are incorporated herein by reference in its entirety.

TECHNICAL FIELD

The disclosed embodiments relate to air conditioning systems, and more particularly, to air conditioning systems used in motor vehicles.

BACKGROUND

There have been various developments in recent years to make all aspects of motor vehicles more efficient. Such increases in efficiency reduce cost and have a positive environmental impact. Large vehicles such as tractor-trailers that are heavily relied on to handle contemporary shipping demands for goods and raw materials are no exception. Indeed, there have been many notable advances with these types of vehicles to make the same more efficient. However, as the cost of fuel continues to rise, there is a continuous effort to offset this increased operating cost and address the environmental impact of combusting excessive fossil fuels by utilizing leaner, lower-cost tractor-trailer type vehicles.

One aspect of the aforementioned tractor-trailer vehicles that has received a significant amount of attention from a cost reduction perspective is the heating, ventilation, and air conditioning (HVAC) system utilized therein. As one example, there has been a growing use of HVAC systems in tractor-trailers that utilize both an engine operated and an electrically operated configuration to provide heating/cooling. Such a system advantageously provides for HVAC service when the engine is running while a driver is operating the vehicle, as well as HVAC service when the engine is not running while a driver is resting in the vehicle. Such a system can be found at U.S. Pat. No. 6,889,762, the entire teachings and disclosure of which is hereby incorporated by reference in its entirety. As another example, there has been a growing desire to make each of the various components within an HVAC loop more efficient, by improving their thermal performance and reducing their power consumption.

While contemporary HVAC systems have vastly improved driver comfort and vehicle flexibility, there is an ongoing need to make such systems more efficient. The embodiments described herein provide various improvements upon the above described HVAC systems. These and other advantages will be apparent from the description provided herein.

SUMMARY

In a vapor compression air conditioning system, refrigerant circulating through the air conditioning loop must be cooled at some point in the cycle so that the refrigerant can absorb heat when it is circulated through the space to be cooled. For example, in a conventional vapor compression air conditioning system, refrigerant is compressed by a compressor and is subsequently circulated to a condenser to be cooled. Typically, the condenser is a refrigerant-to-air heat exchanger, and a mechanical fan blows air over the heat exchanger to cool the refrigerant. After being cooled in the condenser, the refrigerant is circulated through an expansion device and to an evaporator, where the cooled refrigerant absorbs heat from the space to be cooled. The refrigerant is then circulated back to the compressor to continue the refrigeration cycle. In a simple sense, the heat that is absorbed by the refrigerant in the cooled space must be removed from the refrigerant by the condenser in order for the refrigeration cycle to provide effective cooling. Thus, the ability to remove the waste heat from the refrigerant is fundamental to the effectiveness of the air conditioning system. Thus, ways of improving the air conditioning system's ability to remove waste heat from refrigerant will help increase the effectiveness and efficiency of the system.

Many alternative fuel vehicles generate motive power using compressed fluids instead of traditional gasoline or diesel fuel. For example, some vehicles use compressed natural gas (or another appropriate hydrocarbon) to power an internal combustion engine that drives the vehicle. Other vehicles use compressed hydrogen to power a fuel cell that generates electricity, and the electricity is used to power an electric motor that drives the vehicle. When compressed fluids expand rapidly, such as when a compressed fluid leaves a high pressure storage tank, the temperature of the fluid decreases. Typically, the low temperature of the expanded or expanding fluid is not harnessed for any useful purpose. The present application, however, describes systems and apparatuses that use the lower temperature of the expanded fluid to cool the refrigerant in an air conditioning system. Capturing this source of cooling that would otherwise be unused results in more efficient and effective cooling by the air conditioning system. Moreover, the process of cooling the refrigerant causes a corresponding increase in the temperature of the expanded or expanding fluid, which can be beneficial for the operation of the engine or fuel cell which is being supplied by the storage tank. These and other benefits provided by the disclosed embodiments are discussed herein.

In accordance with some embodiments, a vehicle air conditioning system comprises a first vapor compression refrigeration loop. The first vapor compression refrigeration loop comprises a first refrigerant compressor and a first evaporator. In some embodiments, the first vapor compression refrigeration loop also includes a condenser. The vehicle air conditioning system also includes a tank for holding a compressed fluid, an outlet configured to carry expanding or expanded fluid from the tank, and a heat exchanger thermally coupled to the first vapor compression refrigeration loop and to the outlet. The heat exchanger is configured to transfer heat from refrigerant carried by the first vapor compression refrigeration loop to the expanding or expanded fluid, where the temperature of the fluid has been reduced as a result of expansion of the compressed fluid upon exiting the tank.

In order for the fluid to have dropped in temperature, it will either be in the process of expanding, or it may have recently expanded but not currently undergoing expansion. While the present application refers to expanded fluid, it is understood that this refers to fluid that is no longer expanding as well as fluid that is still expanding.

BRIEF DESCRIPTION OF THE DRAWINGS

The embodiments disclosed herein and shown in the accompanying drawings are illustrated by way of example, and not by way of limitation. Like reference numerals refer to corresponding parts throughout the drawings.

DETAILED DESCRIPTION

Figure 1:
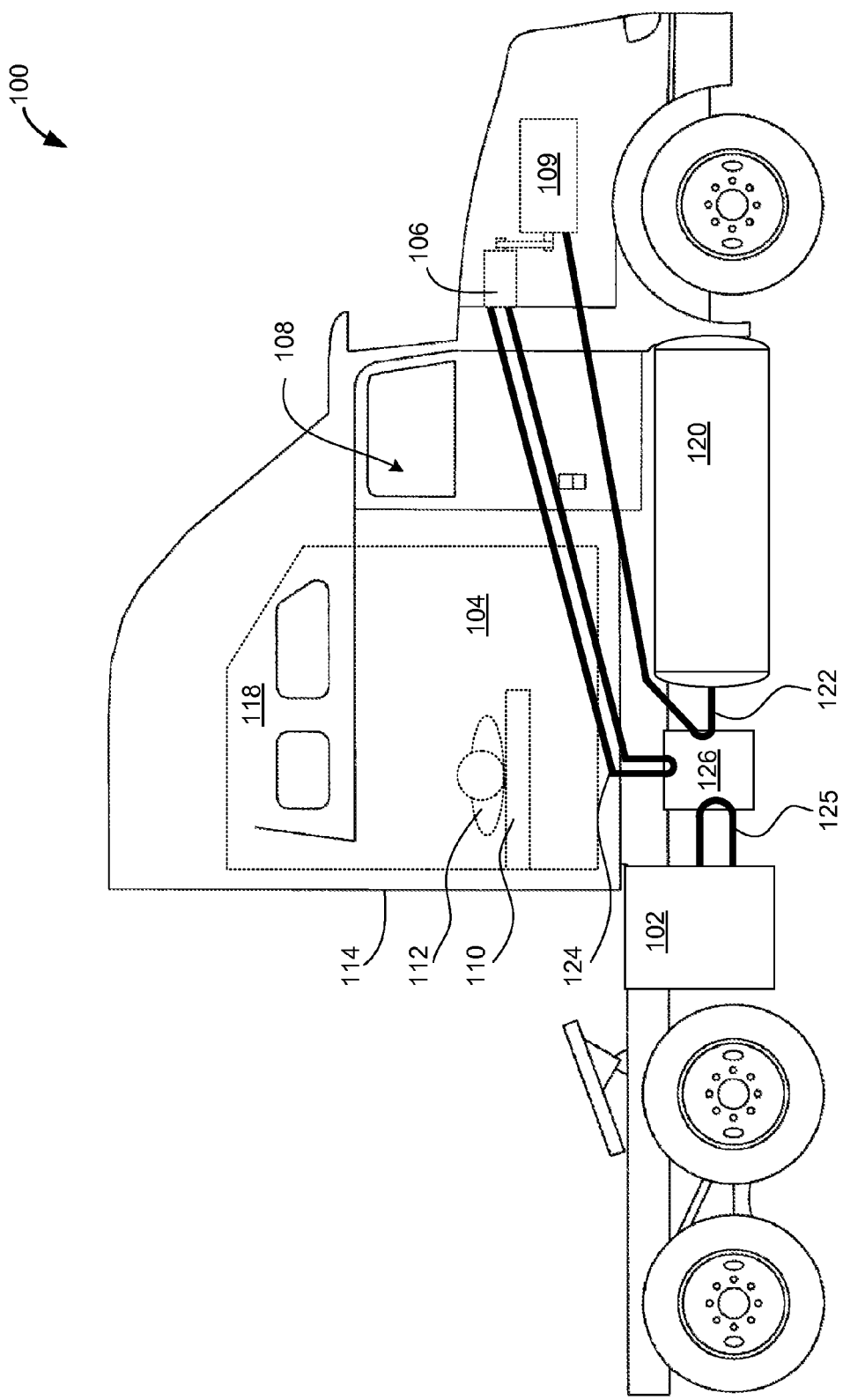
FIG. 1 is a schematic representation of a vehicle according to some embodiments.

FIG. 1 is a schematic representation of an embodiment of a vehicle 100, such as an over-the-road commercial truck, with an air conditioning system that uses the cooling capacity of expanded fluid to remove waste heat from refrigerant. While the figures and description contemplate an over-the-road commercial vehicle, those skilled in the art will recognize that the systems and methods described herein are equally applicable to other types of vehicles.

In some embodiments the vehicle includes a cab 108. A vehicle operator may operate the vehicle 100 from within the cab 108. Some embodiments also include a sleeping area 104 containing one or more beds 110 on which the vehicle operator 112 or passenger may sleep or rest. In some embodiments, the sleeping area 104 is separated from the cab 108 by a retractable curtain or door, which may thermally separate the cab 108 from the sleeping area 104. In some embodiments, the sleeping area 104 is located within the outer shell of the vehicle cab between a back end wall 114 and a pair of sidewalls 118 extending generally perpendicular to the back end wall 114. The bed 110 is typically provided along the back end wall 114 of the sleeping area 104 with one side adjacent the back end wall 114 and two other sides or ends adjacent the sidewalls 118. Thus, three sides of the bed 110 are typically encompassed or surrounded by the shell of the sleeping area 104. This leaves an open side of the bed 110 along the front where a person can maneuver into and out of the bed 110. The bed 110 is typically elevated a few feet above the floor of the sleeping area 110.

In some embodiments, the thermal environment of the cab 108 is controlled with a primary air conditioning system 106 (e.g., a heater and/or air conditioner). In some embodiments, this air conditioning system uses a traditional belt-driven compressor that is mechanically coupled to the vehicle's engine 109 to operate the primary air conditioning system 106 when the engine 109 is running In some embodiments, the vehicle 100 includes an auxiliary air conditioning system 102 (e.g. a heater and/or air conditioner) to control the thermal environment of the sleeping area 104. It should, however, be appreciated that the auxiliary air conditioning system 102 may heat or cool the cab 108 or any other area of the vehicle, with or without the assistance of the primary air conditioning system 106. Moreover, while the auxiliary air conditioning system 102 is shown in FIG. 1 as being attached to a frame rail of the vehicle 100, this is only one of several possible locations for the auxiliary air conditioning system 102. For example, in some embodiments, the auxiliary air conditioning system 102 is mounted on top of the cab 108. In some embodiments, the auxiliary air conditioning system 102 is mounted on an outside of the back end wall 114. In some embodiments, various components of the auxiliary air conditioning system 102 are mounted in various places on or in the vehicle.

The vehicle 100 includes one or more tanks 120 that store compressed fluid (e.g., a fuel such as compressed natural gas) that is used by the engine 109 (e.g., a compressed natural gas engine) to generate motive power for the vehicle 100. The vehicle 100 further includes one or more lines 122 that carry the fluid from the tank(s) 120 to the engine 109.

Both the primary air conditioning system 106 and the auxiliary air conditioning system 102 include refrigerant lines (lines 124 and 125, respectively) that are thermally coupled to a heat exchanger 126. The heat exchanger 126 is, in turn, thermally coupled to an outlet of the one or more tanks 120. As described herein, when fluid leaves the one or more tanks 120, it expands, causing the temperature of the fluid to drop. The cooling capacity generated by the expanded fluid can then be captured by the primary and/or the auxiliary air conditioning systems 106, 102 through the heat exchanger 126.

As depicted in the embodiment shown in FIG. 1, the outlet of the one or more tanks 120 includes or encompasses at least a segment of the one or more lines 122 that carry fluid from the one or more tanks 120 to the engine 109. In some embodiments, the outlet is any portion of the one or more lines 122, one or more tanks 120, or any other component, that experiences a reduction in temperature as a result of the expansion of a fluid from the tank.

Figure 2A:
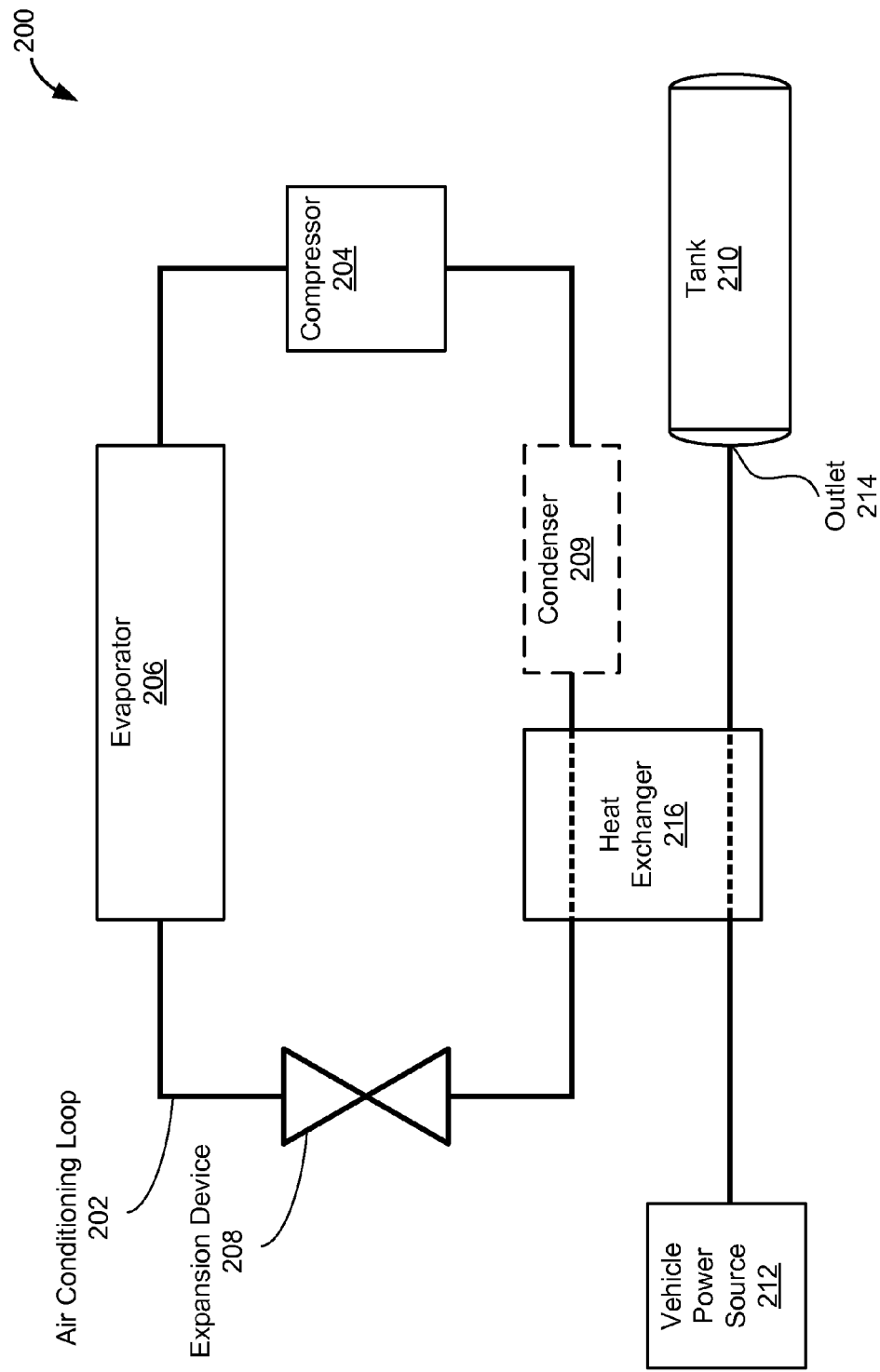
FIG. 2A is a schematic representation of one embodiment of an air conditioning system.

FIG. 2A is a schematic representation of an air conditioning system 200 in accordance with some embodiments. The air conditioning system 200 is configured to take advantage of the cooling effect caused by expanding fluid from a vehicle's fuel tank(s) in order to cool refrigerant in the vapor-compression loop portion of the air conditioning system 200. The air conditioning system 200 shown in FIG. 2A can be viewed as a more detailed schematic representation of the primary air conditioning system 106 and/or the auxiliary air conditioning system 102 depicted in FIG. 1.

The air conditioning system 200 includes a first vapor compression air conditioning loop 202 (hereinafter "air conditioning loop 202"). The term "loop" as used herein includes the refrigerant lines, fittings, coils, compressors, pumps, valves, and other various components used in a vehicle-based vapor-compression air conditioning system. The air conditioning loop 202 includes a compressor 204, an evaporator 206, an expansion device 208, and an optional condenser 209.

In some embodiments, the compressor 204 is an engine-belt driven compressor that is mechanically coupled to an engine of the vehicle (e.g., the vehicle power source 212, discussed herein). In some embodiments, the compressor is an electrically-driven compressor that is not dependent on engine operation for its operation.

The air conditioning system 200 also includes a tank 210 that is configured to hold a compressed fluid. In some embodiments, the tank 210 is fluidly coupled to a vehicle power source 212. As described above, in some embodiments, the fluid is used by the vehicle power source 212 to generate motive power for the vehicle. For example, in some embodiments, the vehicle power source 212 is a combustion engine, and the fluid is a combustible fuel, such as a hydrocarbon. In some embodiments, the fuel is any of: liquefied natural gas (LNG), liquefied petroleum gas (LPG), compressed natural gas (CNG), or any other suitable fuel.

In some embodiments, the vehicle power source 212 is a fuel cell, and the fluid is hydrogen. A fuel cell uses hydrogen to generate electricity, which is then used to power one or more electric motors that drive the vehicle.

In some embodiments, the vehicle power source 212 is a pneumatic motor that generates motive power for the vehicle by harnessing mechanical energy produced by an expanding gas. For example, a pneumatic motor may be a rotary vane motor, piston motor, etc. In such cases, the fluid is air, nitrogen, or any other appropriate compressed fluid.

In some embodiments, the expanded fluid is passed through a turbine or other mechanism that generates mechanical work or electrical energy that is, in turn, used to drive a compressor (e.g., compressor 204). Thus, additional energy can be harnessed from the expanded fluid to reduce the thermal loading and/or increase the efficiency of the air conditioning system 200.

In some embodiments, the compressed fluid is not used by the vehicle 100 to generate motive power. Rather, the compressed fluid may be used for any suitable purpose. In some cases, the compressed fluid is used solely to provide the cooling benefits as described herein, and is not otherwise used by the vehicle 100 for any purpose.

The air conditioning system 200 also includes an outlet 214 that is configured to carry expanded fluid away from the tank 210 (e.g., to a power source 212). The outlet 214 is any portion of the tank, or any component coupled to the tank, that carries expanded fluid from the tank 210, including but not limited to pipes, tubes, lines, fittings, nozzles, valves, manifolds, and the like.

When the compressed fluid exits the tank 210, the fluid expands, which causes the temperature of the fluid to drop. This temperature drop causes components that carry the fluid (or that are thermally coupled to the fluid or to components carrying the fluid) to become cold. Accordingly, as shown in FIG. 2A, the air conditioning system 200 includes a heat exchanger 216 that is thermally coupled to the outlet 214 and to the air conditioning loop 202 in order to take advantage of the thermal capacity available due to the temperature drop of the fluid.

The heat exchanger 216 is any appropriate heat exchanging mechanism, including, but not limited to, a tube-in-tube heat exchanger, a shell and tube heat exchanger, a plate heat exchanger, or the like. In some embodiments, the heat exchanger 216 is a refrigerant line that is coiled around a fuel line or outlet component of a tank (e.g., a regulator, valve, manifold, etc.). Other appropriate heat exchanging mechanisms or techniques are also contemplated.

As described above, the heat exchanger 216 is configured to transfer heat from refrigerant carried by the first air conditioning loop 202 to fluid carried by the outlet 214, where the temperature of the fluid carried by the outlet 214 has been reduced as a result of expansion of the fluid upon exiting the tank 210. In particular, the heat exchanger 216 is coupled to the air conditioning loop 202 at a point where waste heat absorbed by the refrigerant at another point in the refrigeration cycle needs to be removed from the refrigerant in order to provide effective cooling. Stated differently, the low temperature of expanded fluid is used to cool the refrigerant in the air conditioning loop 202. Typically, the waste heat is removed by a condenser (e.g., the condenser 209). With the heat exchanger 216, however, the cooling capacity of the cold, expanded fluid in the outlet 214 is used to remove some or all of the waste heat from the refrigerant in the air conditioning loop 202.

In some embodiments, the cooling effect provided by the expanded fluid (through the heat exchanger 216) reduces the thermal loading on the condenser 209 of the air conditioning loop 202 to which the heat exchanger is coupled. Thus, the air conditioning loop 202 can be supplied with a smaller, less efficient, and/or less costly condenser than would otherwise be necessary in order to provide the same cooling capacity.

In some embodiments, the cooling provided by the expanded fluid is sufficient to provide all of the waste heat removal required by the air conditioning loop 202, eliminating the need for a condenser entirely. Thus, in some embodiments, the air conditioning loop 202 does not include a condenser. In some embodiments where no condenser is used, the heat exchanger 216 is coupled to the air conditioning loop 202 between the compressor 204 and the expansion device 208.

In some embodiments, the cooling effect provided by the expanded fluid (through the heat exchanger 216) reduces the thermal loading on the air conditioning loop 202 such that a smaller or less costly compressor can be used while still providing adequate cooling capacity.

FIG. 2A shows the heat exchanger 216 coupled to the air conditioning loop 202 downstream of the condenser 209, between the condenser 209 and the expansion device 208. This location is merely exemplary, however, and the heat exchanger 216 can be coupled to the air conditioning loop 202 at any appropriate location and to provide any appropriate cooling function. For example, in some embodiments, the heat exchanger 216 is coupled to the air conditioning loop 202 between the compressor 204 and the condenser 209.

In some embodiments, the heat exchanger 216 is used as a pre-charger of the evaporator 206 of the air conditioning loop 202. In some embodiments, the heat exchanger 216 is used as a subcooler of the air conditioning loop 202. The particular location or portion of the air conditioning loop 202 to which the heat exchanger 216 is mechanically or functionally coupled is selected according to the particular function that the heat exchanger 216 is to serve.

Figure 2B:
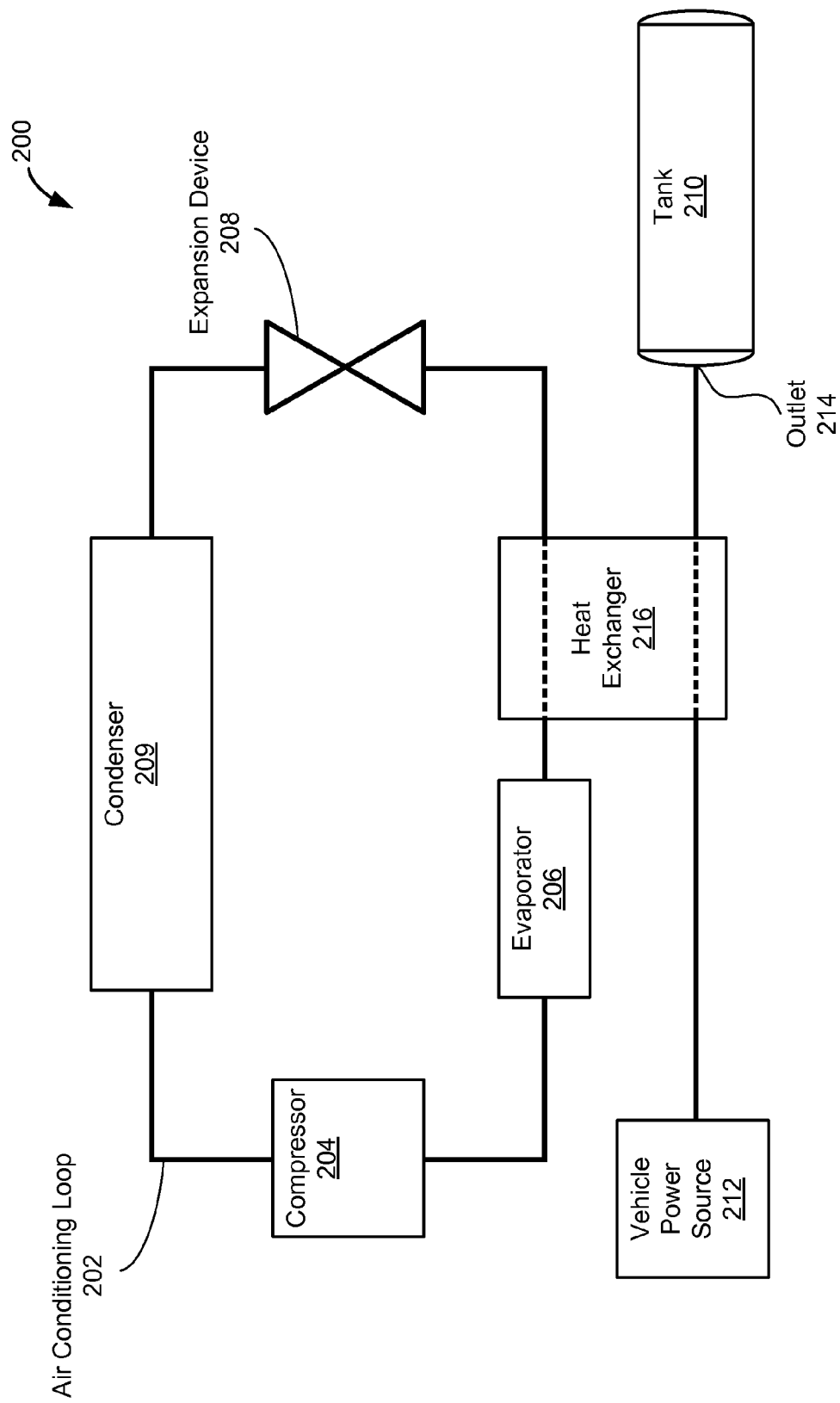
FIG. 2B is a schematic representation of another embodiment of an air conditioning system.

FIG. 2B is an exemplary illustration of the air conditioning system 200 where the heat exchanger 216 is coupled to the air conditioning loop 202 between the expansion device 208 and the evaporator 206. As shown in FIG. 2B, heat is removed from the refrigerant prior to the refrigerant being introduced into the evaporator 206.

In some embodiments, the heat exchanger 216 (or another heat exchanger that is thermally coupled to the outlet 214) is instead or additionally coupled to another portion of the air conditioning loop 202, another component of the air conditioning system 200, or another component of a vehicle (e.g., the vehicle 100, FIG. 1), thus using the cooling capacity of the expanded fluid for other useful purposes. For example, in some embodiments, the heat exchanger 216 (or an additional heat exchanger, not shown) is thermally coupled to the outlet 214 and to an electric motor that drives the compressor 204. Cooling the compressor motor using the heat sink capabilities of the expanded fluid can help draw heat away from the motor, thus allowing the use of a smaller motor, or allowing a motor to be driven faster or more frequently than would otherwise be possible. The cooling provided by the expanded fluid can be used to cool other components as well, including electronic drive components for an electric motor that drives the compressor 204 (e.g., a variable speed drive that provides power to and controls the speed of an electric compressor motor), batteries, electronic drive components for an electric motor that drives the vehicle, a vehicle engine (e.g., engine coolant of an internal combustion engine), or any other component for which cooling is desired.

Where additional components or portions of the air conditioning system 200 (or the vehicle) are to be cooled from the cooling capacity of the expanded fluid, additional heat exchanging mechanisms of any appropriate type or form can be coupled to the outlet 214. In some embodiments, a heat exchanging mechanism is simply a portion of a fuel line that is in thermal contact with another component to be cooled.

While FIGS. 2A and 2B show only one tank 214, additional tanks may be included as well. Specifically, a vehicle may include multiple tanks, and those tanks may share one outlet (e.g., they may all feed into one line that leads to a vehicle power source). Alternatively, multiple tanks may not share outlet components (e.g., they may each have a separate outlet that leads to a vehicle power source). In some embodiments where multiple tanks are used, the heat exchanger 216 is coupled to the outlets of both tanks For example, where multiple tanks have a common outlet (or at least one area of an outlet in common), the heat exchanger may be coupled to the common outlet. As another example, where multiple tanks each have a separate outlet, the heat exchanger 216 is coupled to the outlets of each of the tanks This way, the cooling effect of both tanks can be used to cool the refrigerant in the air conditioning loop 202.

Figure 3:
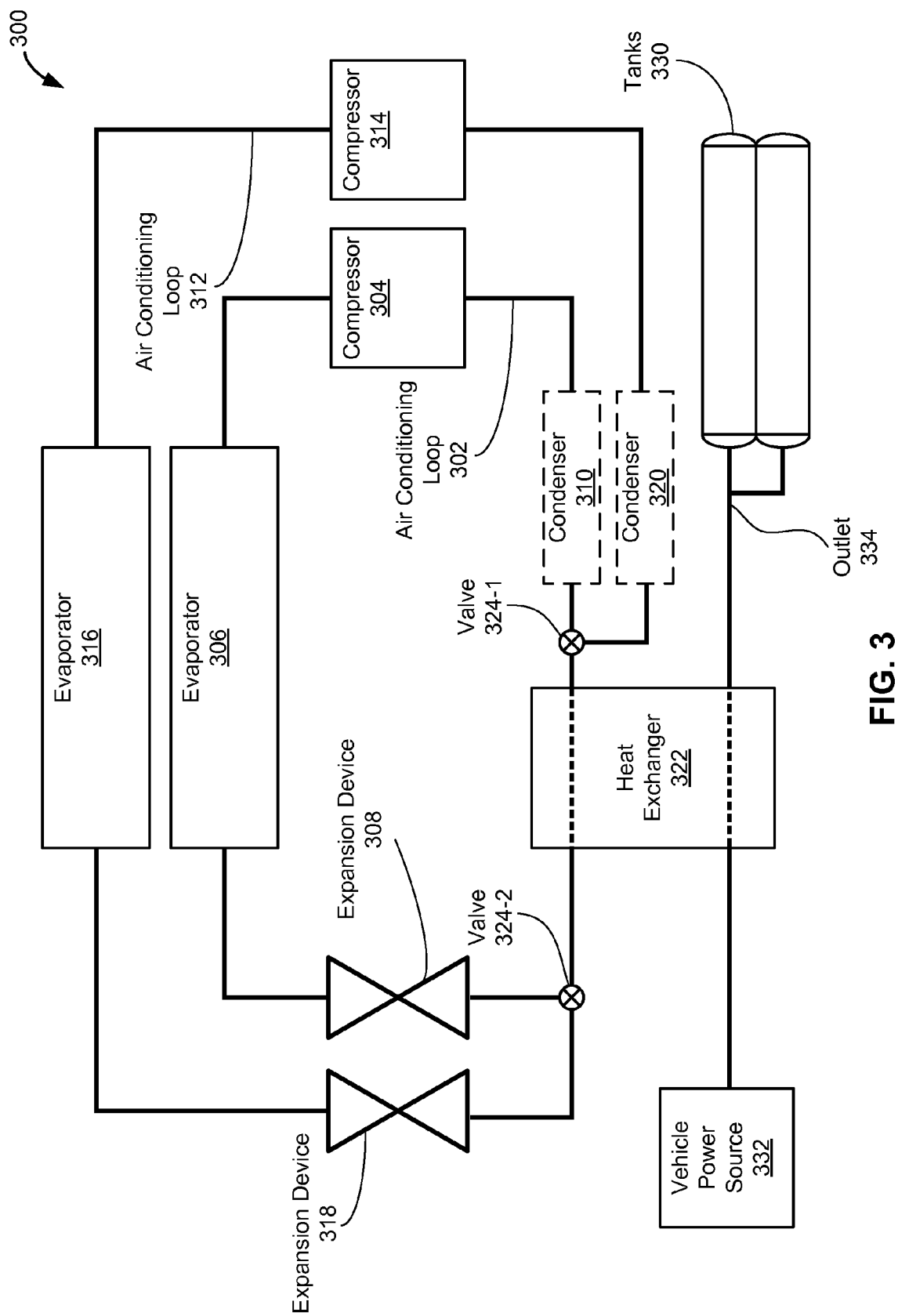
FIG. 3 is a schematic representation of yet another embodiment of an air conditioning system.

FIG. 3 is a schematic representation of a dual-loop air conditioning system 300 in accordance with some embodiments. The dual-loop air conditioning system 300 includes two vapor compression air conditioning loops. The first vapor compression air conditioning loop 302 ("first air conditioning loop 302") includes a first compressor 304, a first evaporator 306, a first expansion device 308, and an optional first condenser 310. The second vapor compression air conditioning loop 312 ("second air conditioning loop 312") includes a second compressor 314, a second evaporator 316, a second expansion device 318, and an optional second condenser 320. While FIG. 3 shows that each air conditioning loop 302, 312 includes separate compressors, condensers, expansion devices, and evaporators, some or all of these components may be shared between these two loops. For example, in some embodiments, only one evaporator is provided, and both the first air conditioning loop 302 and the second air conditioning loop 312 use the same evaporator. As another example, in some embodiments, only one condenser is provided, and both the first and the second air conditioning loops 302, 312 use the same condenser. In some embodiments, the first and the second air conditioning loops 302, 312 share a compressor and/or an expansion device as well.

In some embodiments, the first compressor 304 is an engine-belt driven compressor, and the second compressor 314 is an electrically driven compressor that is not dependent upon engine operation for its operation. In some embodiments, the second compressor 314 is an engine-belt driven compressor, and the first compressor 304 is an electrically driven compressor that is not dependent upon engine operation for its operation. In other embodiments, both loops may include belt-driven, engine operated compressors, or electrically driven compressors.

The components of the first air conditioning loop 302 and the second air conditioning loop 312 are analogous to the components of the air conditioning loop 202 described above with respect to FIG. 2A, and the descriptions of these components are analogous to the components of the first and second air conditioning loops 302, 312. Accordingly, the details of those components are incorporated by reference to FIG. 3, and are not repeated here.

Both the first air conditioning loop 302 and the second air conditioning loop 312 are coupled to a heat exchanger 322. The heat exchanger 322 in FIG. 3 is analogous to the heat exchanger 216 described above with respect to FIG. 2A, and the description of the heat exchanger (including its operation, configuration, benefits, effect on the air conditioning loops, and suitable locations and uses within an air conditioning system) are applicable to the heat exchanger 322 as well.

The dual-loop air conditioning system 300 also includes a plurality of tanks 330 that are configured to hold a compressed fluid. In some embodiments, the tanks 330 are coupled to a vehicle power source 332, and provide the fluid to the vehicle power source 332. As described above, the fluid is used by the vehicle power source 332 to generate motive power for the vehicle. Once again, tanks and vehicle power sources are described above with respect to FIG. 2A. Accordingly, the details of these components are incorporated by reference to FIG. 3, and are not repeated here.

While FIGS. 2A and 2B illustrate a single tank 210, FIG. 3 illustrates an embodiment with a plurality of tanks 330 that share a common outlet area 334. The plurality of tanks 330 are provided to illustrate how a plurality of tanks 330 may be incorporated into an air conditioning system in some embodiments. The dual-loop air conditioning system 300 does not necessarily require a plurality of tanks, however, and may also be fitted with only one tank, as shown in FIGS. 2A-2B, or even more tanks than shown in FIG. 3.

In some embodiments, in order to share the heat exchanger 322 between two air conditioning loops, the dual-loop air conditioning system 300 includes one or more valves 324 (e.g., valves 324-1, 324-2) for controlling the flow of refrigerant through the first air conditioning loop 302 and the second air conditioning loop 312. Specifically, the one or more valves 324 are configured to allow refrigerant to flow through either the first air conditioning loop 302 or the second air conditioning loop 312, or both, depending on the particular operational state of the air conditioning system 300.

In some embodiments, the dual-loop air conditioning system 300 does not include all of the valves 324 shown in FIG. 3. For example, in some embodiments, the dual-loop air conditioning system 300 includes only valve 324-1. Alternatively, in some embodiments, the dual-loop air conditioning system 300 includes only valve 324-2. In yet another embodiment, the dual-loop air conditioning system 300 does not include any valves.

As shown in FIG. 3, the heat exchanger 322 has only one refrigerant inlet, and the refrigerant lines of the first air conditioning loop 302 and the second air conditioning loop 312 are joined downstream and upstream of the heat exchanger 322 so that both air conditioning loops can use the heat exchanger 322. In alternative embodiments, the heat exchanger 322 includes multiple (e.g., two or more) refrigerant or fluid inlets, and the first air conditioning loop 302 and the second air conditioning loop 312 are each coupled to separate inlets of the heat exchanger 322.

Figure 4:
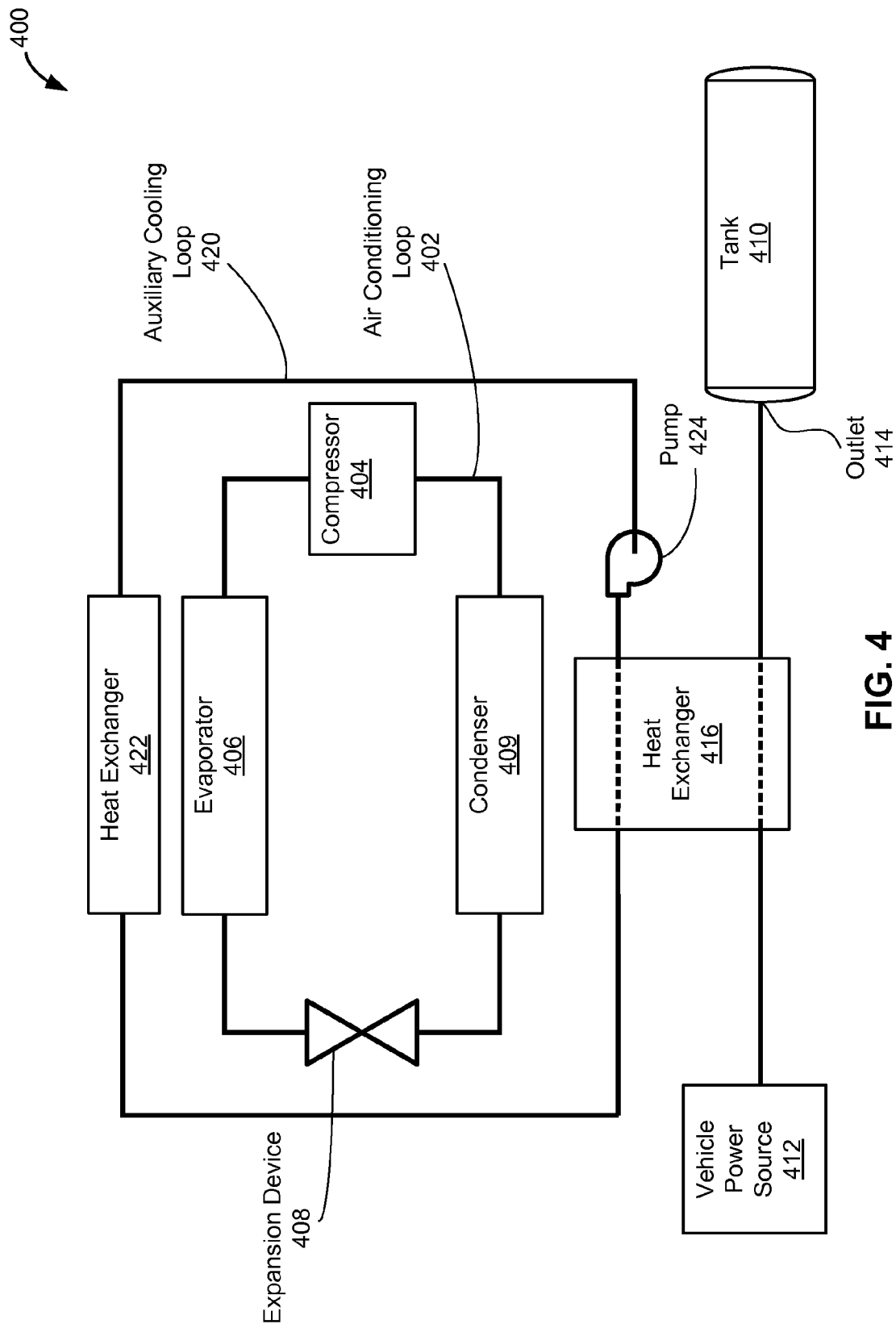
FIG. 4 is a schematic representation of a final embodiment of an air conditioning system.

FIG. 4 is a schematic representation of an air conditioning system 400 in accordance with some embodiments. The air conditioning system 400 includes a vapor compression air conditioning loop 402 ("air conditioning loop 402") that includes a compressor 404, an evaporator 406, an expansion device 408, and a condenser 409. In some embodiments, the compressor 404 is an engine-belt driven compressor; in other embodiments, the compressor 404 is an electrically driven compressor that is not dependent upon engine operation for its operation.

The components of the air conditioning loop 402 are analogous to the components of the air conditioning loop 202 described above with respect to FIG. 2A, and the descriptions of these components are analogous to the components of the air conditioning loop 402. Accordingly, the details of those components are incorporated by reference to FIG. 4, and are not repeated here.

The auxiliary cooling loop 420 includes a heat exchanger 422, a pump 424, and one or more coolant lines, fittings, coils, compressors, pumps, valves, and other various components used in a cooling loop. In some embodiments, the auxiliary cooling loop 420 is configured to circulate coolant (e.g., liquid coolant such as water, antifreeze, mixtures of water and antifreeze, or any other appropriate coolant) using a pump 424 (e.g., a centrifugal pump, lobe pump, scroll pump, screw pump, peristaltic pump, piston pump, etc.). The coolant is circulated through a heat exchanger 422 in order to deliver cooling (or heating) to an appropriate component or space.

The air conditioning system 400 also includes a tank 410 that is configured to hold a compressed fluid. In some embodiments, the tank 410 is coupled to a vehicle power source 412, and provides the fluid to the vehicle power source 412. As described above, the fluid is used by the vehicle power source 412 to generate motive power for the vehicle. Once again, tanks and vehicle power sources are described above with respect to FIG. 2A. Accordingly, the details of these components are incorporated by reference to FIG. 4, and are not repeated here.

As shown in FIG. 4, the air conditioning system 400 includes a heat exchanger 416 that is thermally coupled to an outlet 414 of the tank 410, and also to the auxiliary cooling loop 420 in order to take advantage of the thermal capacity available due to the temperature drop of the fluid after the fluid has left the tank. The heat exchanger 416 in FIG. 4 is analogous to the heat exchanger 216 described above with respect to FIG. 2A, and the description of the heat exchanger 216 is applicable to the heat exchanger 416 as well.

In FIG. 4, the auxiliary cooling loop 420 is coupled to the heat exchanger 416. In particular, the heat exchanger 416 is configured to remove heat from coolant circulating through the auxiliary cooling loop 420, thus providing cooling capacity to the auxiliary cooling loop 420. The coolant is then circulated to the heat exchanger 422, which removes heat from an environment or component that is thermally coupled to the heat exchanger 422.

For example, in some embodiments, the heat exchanger 422 is a coolant-to-air heat exchanger that is located near (or coupled to) the evaporator 406. Thus, when the air conditioning loop 402 is in operation (e.g., cooling an interior compartment of a vehicle), the auxiliary cooling loop 420 provides additional cooling capacity for the air conditioning system 400.

In some embodiments, both the air conditioning loop 402 and the auxiliary cooling loop 420 are configured to operate at the same time. Thus, due of the additional cooling capacity provided by the auxiliary cooling loop 420, an air conditioning loop 402 with a smaller cooling capacity (and, thus, a cheaper, smaller, lighter, and more efficient air conditioning system) can be selected. Even if the thermal capacity of the air conditioning loop 402 is not reduced (e.g., when the auxiliary cooling loop 420 is included as an aftermarket addition to an existing air conditioning loop 402), the additional cooling capacity of the auxiliary cooling loop 420 can result in greater efficiencies because the air conditioning loop 402 will not have to run as often or produce as much cooling as it otherwise would.

In some embodiments, the auxiliary cooling loop 420 is configured to operate when the air conditioning loop 402 is not operating. For example, the auxiliary cooling loop 420 may be configured to operate alone if the auxiliary cooling loop 420 is able to satisfy the cooling demand, such as when only a small amount of cooling is required. If the demand increases beyond the capabilities of the auxiliary cooling loop 420, the air conditioning loop 402 is activated in order to provide the additional required cooling capacity.

In some embodiments, the auxiliary cooling loop 420 is not used to cool the same space or components as the air conditioning loop 402. For example, whereas the air conditioning loop 402 may be primarily configured to cool an interior portion of a vehicle (e.g., the cab 108 of the vehicle 100, FIG. 1), the auxiliary cooling loop 420 can be configured to cool a different portion of a cab than the air conditioning loop 402, or another component of the vehicle 100 (e.g., a battery, control or power electronics, motors, engines, etc.).

Figure 5:
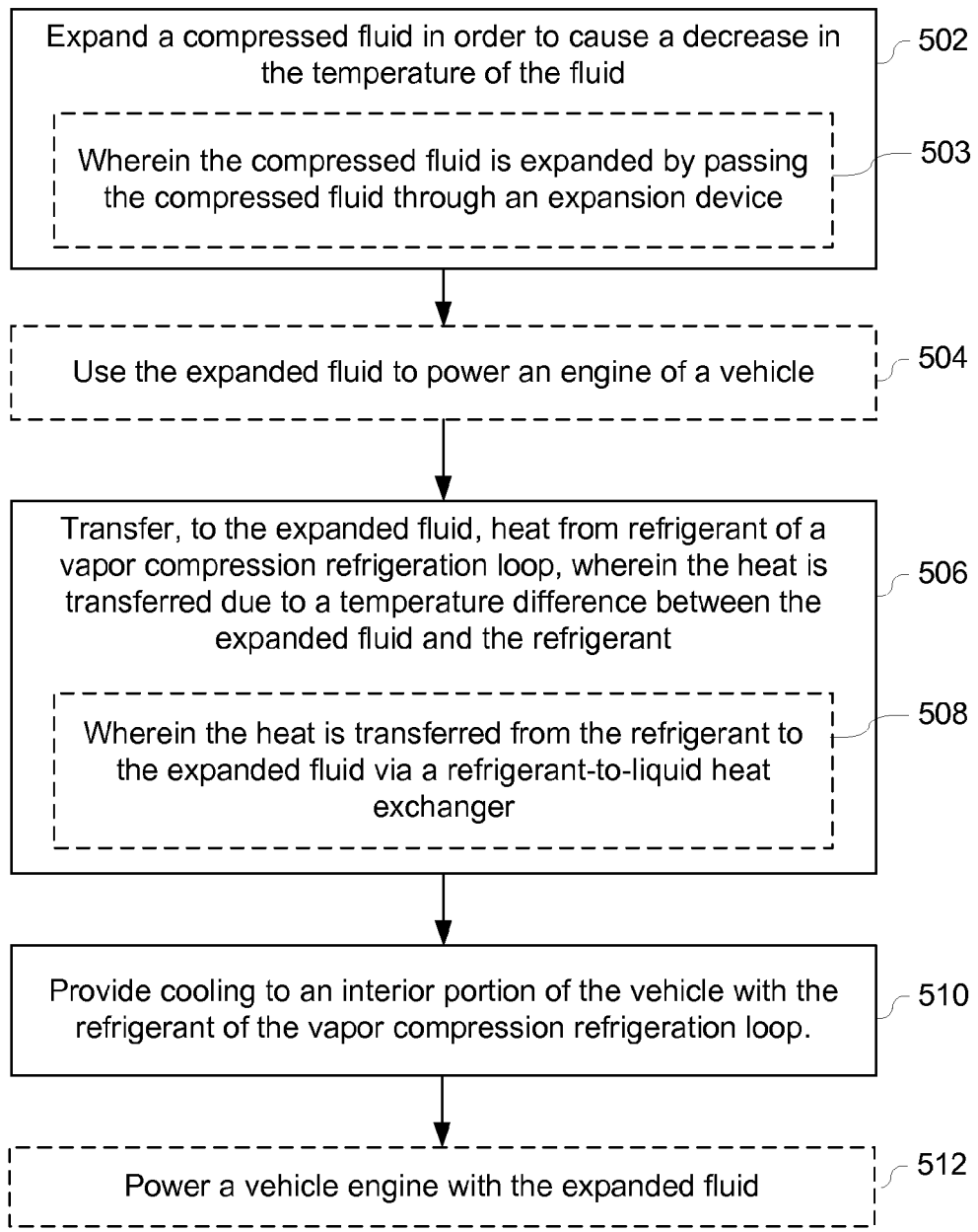
FIG. 5 is a flowchart illustrating a method of operating air conditioning system according to some embodiments.

FIG. 5 is a flow chart illustrating a method 400 of operating a vapor compression air conditioning system, in accordance with some embodiments. The method includes expanding a compressed fluid in order to cause a decrease in the temperature of the fluid (502). In some embodiments, the compressed fluid is stored in a storage tank mounted on a vehicle. In some embodiments, the compressed fluid is expanded by passing compressed fluid through an expansion device (e.g., an expansion valve, expansion orifice, etc.) (503).

In some embodiments, the method further includes using the expanded fluid to power an engine of a vehicle (504). In some embodiments, the engine of the vehicle is a fuel cell, and the fluid is hydrogen. In some embodiments, the engine of the vehicle is a combustion engine, and the fluid is selected from the group consisting of: liquefied natural gas (LNG), liquefied petroleum gas (LPG), and compressed natural gas (CNG). In some embodiments, the engine of the vehicle is a pneumatic motor, and the fluid is air.

The method further includes transferring, to the expanded fluid, heat from refrigerant of a vapor compression refrigeration loop, wherein the heat is transferred due to a temperature difference between the expanded fluid and the refrigerant (506). In some embodiments, the heat is transferred from the refrigerant to the expanded fluid via a refrigerant-to-liquid heat exchanger (508).

The method further includes providing cooling to an interior portion of the vehicle with the refrigerant of the vapor compression refrigeration loop (510). For example, the vapor compression refrigeration loop can correspond to a vapor-compression air conditioning system of a vehicle, where refrigerant is passed through an evaporator (e.g., evaporator 206, FIG. 1), among other components, in order to cool the air within an interior compartment of a vehicle.

In some embodiments, the method further includes powering a vehicle engine with the expanded fluid (512). For example, after the expanded fluid has passed through the heat exchanger, it is used by an engine (e.g., a fuel cell, combustion motor, or pneumatic motor) to generate motive power for the vehicle.

In the foregoing discussion, plural instances are, optionally provided for components, operations, or structures described herein as a single instance. Finally, boundaries between various components, operations, and data stores are somewhat arbitrary, and particular operations are illustrated in the context of specific illustrative configurations. Other allocations of functionality are envisioned and optionally fall within the scope of the embodiment(s). In general, structures and functionality presented as separate components in the example configurations are, optionally, implemented as a combined structure or component. Similarly, structures and functionality presented as a single component are, optionally, implemented as separate components. These and other variations, modifications, additions, and improvements fall within the scope of the embodiment(s).

It will also be understood that, although the terms "first," "second," are, in some circumstances, used herein to describe various elements, these elements should not be limited by these terms. These terms are only used to distinguish one element from another. For example, a first contact could be termed a second contact, and, similarly, a second contact could be termed a first contact, which changing the meaning of the description, so long as all occurrences of the "first contact" are renamed consistently and all occurrences of the second contact are renamed consistently. The first contact and the second contact are both contacts, but they are not the same contact.

The terminology used herein is for the purpose of describing particular embodiments only and is not intended to be limiting of the claims. As used in the description of the embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof As used herein, the term "if" is, optionally, construed to mean "when" or "upon" or "in response to determining" or "in accordance with a determination" or "in response to detecting," that a stated condition precedent is true, depending on the context. Similarly, the phrase "if it is determined (that a stated condition precedent is true)" or "if (a stated condition precedent is true)" or "when (a stated condition precedent is true)" is, optionally, construed to mean "upon determining" or "in response to determining" or "in accordance with a determination" or "upon detecting" or "in response to detecting" that the stated condition precedent is true, depending on the context.

The foregoing description included example systems, methods, techniques, instruction sequences, and computing machine program products that embody illustrative embodiments. For purposes of explanation, numerous specific details were set forth in order to provide an understanding of various embodiments of the inventive subject matter. It will be evident, however, to those skilled in the art that embodiments of the inventive subject matter is, optionally, practiced without these specific details. In general, well-known instruction instances, protocols, structures and techniques have not been shown in detail.

The foregoing description, for purpose of explanation, has been described with reference to specific embodiments. However, the illustrative discussions above are not intended to be exhaustive or to limit the embodiments to the precise forms disclosed. Many modifications and variations are possible in view of the above teachings. The embodiments were chosen and described in order to best explain the principles and their practical applications, to thereby enable others skilled in the art to best utilize the embodiments and various embodiments with various modifications as are suited to the particular use contemplated.

What is claimed is:

1. A vehicle air conditioning system, comprising:
    a first vapor compression refrigeration loop comprising:
        a first refrigerant compressor; and
        a first evaporator; and
    a tank configured to hold a compressed fluid, the compressed fluid configured to drive a vehicle power source;
    a tank outlet configured to allow fluid from the tank to flow to and drive the vehicle power source, wherein the tank outlet is configured to reduce the temperature of the fluid as a result of expansion of the fluid upon exiting the tank; and
    a heat exchanger coupled to the first refrigeration loop, the heat exchanger comprising:
        a first refrigerant inlet coupled to the first refrigeration loop;
        a fluid inlet coupled to the tank outlet; and
        a fluid outlet coupled to the vehicle power source;
    wherein the heat exchanger is configured to transfer heat from refrigerant in the refrigeration loop to the fluid from the tank; and
    wherein the heat exchanger is further configured to provide the heated fluid to the vehicle power source without returning the heated fluid to the tank.

2. The vehicle air conditioning system of claim 1, further comprising:
    a second vapor compression refrigeration loop, the second vapor compression refrigeration loop comprising:
        a second refrigerant compressor; and
        a second evaporator;
    wherein the second vapor compression refrigeration loop is coupled to the first refrigerant inlet or a second refrigerant inlet of the heat exchanger such that heat carried by the refrigerant in the second vapor compression refrigeration loop is transferred to the fluid.

3. The vehicle air conditioning system of claim 2, wherein the first refrigerant compressor is an engine-belt driven compressor, and the second refrigerant compressor is an electrically driven compressor.

4. The vehicle air conditioning system of claim 2, wherein the first refrigerant compressor is an electrically driven compressor, and the second refrigerant compressor is an engine-belt driven compressor.

5. The vehicle air conditioning system of claim 1, wherein the vehicle air conditioning system is installed in a vehicle, and the vehicle is configured to derive motive power from the fluid.

6. The vehicle air conditioning system of claim 5, the vehicle including a fuel cell and one or more electric motors for generating motive power for the vehicle, wherein the fuel cell is configured to use hydrogen to create electricity to drive the one or more electric motors.

7. The vehicle air conditioning system of claim 5, wherein the vehicle includes an engine configured to provide motive power to the vehicle as a result of combustion of the fluid.

8. The vehicle air conditioning system of claim 7, wherein the fluid is a hydrocarbon, and the vehicle includes a combustion engine that generates motive power for the vehicle through combustion of the hydrocarbon.

9. The vehicle air conditioning system of claim 8, wherein the hydrocarbon is selected from the group consisting of: liquefied natural gas (LNG); liquefied petroleum gas (LPG); and compressed natural gas (CNG).

10. The vehicle air conditioning system of claim 1, wherein the heat exchanger is a tube-in-tube heat exchanger.

11. The vehicle air conditioning system of claim 1, wherein the heat exchanger is a shell and tube heat exchanger.

12. The vehicle air conditioning system of claim 1, wherein the heat exchanger is a plate heat exchanger.

13. The vehicle air conditioning system of claim 1, wherein the first vapor compression refrigeration loop further comprises a first condenser and a first expansion device.

14. The vehicle air conditioning system of claim 13, wherein the heat exchanger is coupled to the vapor compression refrigeration loop between the first compressor and the first condenser.

15. The vehicle air conditioning system of claim 13, wherein the heat exchanger is coupled to the vapor compression refrigeration loop between the first condenser and the first expansion device.

16. The vehicle air conditioning system of claim 1, wherein the vapor compression refrigeration loop includes a first expansion device and does not include a refrigerant-to-air condenser.

17. The vehicle air conditioning system of claim 16, wherein the heat exchanger is coupled to the first vapor compression refrigeration loop between the first compressor and the first expansion device.

18. The vehicle air conditioning system of claim 1, wherein the compressed fluid comprises a fuel for the vehicle power source.

\* \* \* \* \*